United States Patent
Priem et al.

(10) Patent No.: US 6,725,457 B1
(45) Date of Patent: Apr. 20, 2004

(54) SEMAPHORE ENHANCEMENT TO IMPROVE SYSTEM PERFORMANCE

(75) Inventors: Curtis Priem, Fremont, CA (US); Rick M. Iwamoto, Cupertino, CA (US)

(73) Assignee: Nvidia Corporation, Santa Clara, CA (US)

( * ) Notice: Subject to any disclaimer, the term of this patent is extended or adjusted under 35 U.S.C. 154(b) by 0 days.

(21) Appl. No.: 09/574,573

(22) Filed: May 17, 2000

(51) Int. Cl.[7] .................................................. G06F 9/00
(52) U.S. Cl. ........................ 718/104; 710/240; 709/226; 709/229
(58) Field of Search ................................. 710/240, 231, 710/22, 371, 28; 709/104, 216, 100, 102, 226, 229; 711/150; 712/1–43, 200–248; 718/104, 216, 100, 102

(56) References Cited

U.S. PATENT DOCUMENTS

| | | | | |
|---|---|---|---|---|
| 5,696,939 A | * | 12/1997 | Iacobovici et al. | ......... 711/150 |
| 6,018,785 A | * | 1/2000 | Wenniger | .................. 710/200 |
| 6,023,738 A | * | 2/2000 | Priem et al. | ................... 710/23 |
| 6,047,316 A | * | 4/2000 | Barton et al. | ............... 709/216 |
| 6,065,071 A | * | 5/2000 | Priem et al. | ................... 710/22 |
| 6,081,854 A | * | 6/2000 | Priem et al. | ................... 710/37 |
| 6,134,579 A | * | 10/2000 | Tavallaei et al. | ............ 709/100 |
| 6,195,676 B1 | * | 2/2001 | Spix et al. | ................... 709/107 |
| 6,199,094 B1 | * | 3/2001 | Presler-Marshall | .......... 709/104 |
| 6,243,793 B1 | * | 6/2001 | Aucsmith et al. | ............ 711/151 |
| 6,260,082 B1 | * | 7/2001 | Barry et al. | ................ 710/22 |
| 6,282,587 B1 | * | 8/2001 | Priem et al. | ................... 710/23 |
| 6,292,854 B1 | * | 9/2001 | Priem | .......................... 710/22 |
| 6,343,338 B1 | * | 1/2002 | Reneris | ...................... 710/200 |
| 6,519,686 B2 | * | 2/2003 | Woodring et al. | .......... 711/147 |
| 6,567,873 B1 | * | 5/2003 | Henriksen | ................... 710/240 |

OTHER PUBLICATIONS

"Operating System Concepts", 1994, Silberschatz et al.*
"Multithreaded Programming Windows NT", 1996, Pham et al.*
"Operating Systems", 1993, Switzer*

* cited by examiner

*Primary Examiner*—John Follansbee
*Assistant Examiner*—Haresh Patel
(74) *Attorney, Agent, or Firm*—Cooley Godward LLP

(57) ABSTRACT

A process of coordinating access to a shared resource by a plurality of execution units is provided. Channel control units are used to coordinate access to a shared resource. Each channel control unit reads semaphore values of a semaphore storage unit. In response to synchronization commands and semaphore values, the channel control unit manages the flow of execution instructions to the execution units in order to manage access to the shared resource.

20 Claims, 13 Drawing Sheets

SEMAPHORE ENHANCEMENT TO IMPROVE SYSTEM PERFORMANCE

BACKGROUND OF THE INVENTION

1. Field of the Invention

The present invention relates generally to an electronic system having a plurality of execution units requiring access to a shared resource, and more specifically to a method and apparatus for managing access to a resource that is shared by a plurality of execution units.

2. Description of the Prior Art

Semaphores are commonly used to enforce mutual exclusion rules for controlling access to shared resources in systems wherein a plurality of execution units, such as processing units and hardware engines, each require access to a shared resource. The shared resource is typically a memory space for storing information which may include a single bit of data, a byte, or a large data structure. The shared resources could also be the processing resources of a processing unit.

Computer operating systems (OS) commonly use semaphores in supervising software processes executed by a central processing unit (CPU), the processes functioning asynchronously and concurrently. Problems arise in an OS when concurrent processes attempt to use shared resources in an improperly synchronized manner. For example, it is generally necessary to prevent one process from writing to a shared resource while another process is reading from it. Semaphores generally serve as control flags for accessing the shared resource.

Another type of system for which semaphores are commonly used is a multiprocessing system which is a computer system having two or more processing units each executing an associated sequence of instructions, and each requiring access to a shared resource. A dedicated processing unit provides yet another example of a system for which semaphores have been used. A dedicated processing unit, such as a graphics processing unit, typically includes a plurality of execution units such as graphics engines, audio engines, video engines, and the like wherein groups of the execution units share resources.

FIG. 1A shows a block diagram generally illustrating a first example of a conventional semaphore based resource sharing system at 10, the system 10 including a plurality of processes 12 each requiring access to a shared resource 14. The shared resource 14, which is typically a portion of memory space, may be a system memory, a cache memory unit, a random access memory unit (RAM), a buffer, or a single register unit.

In the depicted example, a first process12 designated PROCESS_1, and a second execution unit designated PROCESS_2 each requires access to the shared resource 14. Each of the processes 12 communicates with each other in accordance with a set of mutual exclusion rules in order to access the shared resource 14 asynchronously. For example, consider that while PROCESS_2 is writing data to the shared resource 14 as illustrated by a line 16, PROCESS_1 needs to read data as illustrated by a line 18. If PROCESS_2 begins writing before PROCESS_1 is done reading, PROCESS_1 is likely to receive corrupted data.

The general rule for accessing the shared resource 14 in the system 10 is that only one of the processes 12 may write to the shared resource 14 at a time. Also, no process may read from the shared resource 14 while another process is writing. In accordance with one well-known resource sharing method, a semaphore 20 is used to indicate ownership of the resource 14 at an instance of time. The semaphore 20 is typically implemented as a semaphore value stored in memory (not shown) that can be accessed by each of the processes 12. In the case of a computer system, the OS usually defines the rules for accessing the shared resources. Each type of OS may have different sets of rules for accessing a shared resource using a semaphore.

In the depicted example, PROCESS_2 may claim ownership of the shared resource 14 by updating the value of the associated semaphore 20 if the semaphore 20 indicates that no process currently owns the shared resource. Thereafter, PROCESS_2 may write to the shared resource. After PROCESS_2 is done writing, PROCESS_2 relinquishes ownership of the shared resource by updating the semaphore 20 with an appropriate value. PROCESS_1, which is operative to sample the semaphore as indicated by a line 24, may subsequently determine that it may claim ownership of the resource, and eventually writes a value into the semaphore 20 to claim ownership. Note that the requirement that a process sample the semaphore can be problematic because time and processing power may be wasted. For example, if one of the processes 12 is a CPU, the CPU will "spin" while repetitively reading the semaphore in order to determine changes in ownership status.

FIG. 1B shows a block diagram generally illustrating a second example of a conventional resource sharing system at 30. In this example, a third process 12 designated PROCESS_3, and a fourth process 12 designated PROCESS_4 both need to write data to the resource 14 at the same time. If PROCESS_3 and PROCESS_4 were to write data to the shared resource 14 at the same time, the result might be that the shared resource 14 would include corrupted data. Therefore, PROCESS_4 may not write to the shared resource 14 as indicated by a line 32 while PROCESS_3 is writing to the shared resource 14 as indicated by a line 34. Likewise, a fifth process designated PROCESS_5 may not read from the shared resource 14 as indicated by a line 36 while PROCESS_3 is writing to the shared resource 14.

FIG. 1C shows a block diagram generally illustrating a third example of a conventional system at 30 including a sixth process designated PROCESS_6 that is operative to write to the resource 14, a seventh process 12 designated PROCESS_7 operative to read from the resource, and an eighth process designated PROCESS_8 operative to read from the resource. PROCESS_7 and PROCESS_8 may read from the resource 14 concurrently as indicated by lines 42 and 44 because data is not modified during reading, but only one process may write to the resource 14 at a time. However, while either or both of PROCESS_7 and PROCESS_8 is reading from the resource, PROCESS_6 cannot write to the resource 14 as indicated by a line 46.

Note that each shared resource must have a semaphore associated with it. If only one semaphore was to be used for two different shared resources, the method would fail. Also, note that any number of processes may share access to a resource. However, a semaphore associated with a particular shared resource must provide a range of values (or must have a number of bits) sufficient to provide a unique value associated with each process sharing access to the resource.

FIG. 2A shows a block diagram generally illustrating a first conventional type of computer graphics system at 50 wherein a plurality of execution units share a resource. The system 50 includes: a CPU 52; a system memory 54 coupled with the CPU via a bus 56 which may be a system bus or a local bus; a graphics engine 58 coupled with the bus via a first channel 60; a disk controller 62 coupled with the bus via a second channel 64; and an audio engine 66 coupled with the bus via a third channel 68. Each of the channels 60, 64 and 68 may be controlled via a programmed input/output (programmed I/O). Data is transferred to engines 58, 62, and 66 in accordance with a method wherein the CPU 52 writes instructions and data to each of the channels 60, 64, and 68, and each of the engines reads instructions and data from the associated channel. The engines 58, 62, and 66 and the channels 60, 64 and 68 provide a parallel I/O sub-system at 70. Note that only one engine or process may access the system memory 54 via the bus at an instant of time.

Each of the channels 60, 64 and 68 is typically a first-in first-out memory device (FIFO) including a dual-ported memory (not shown) having a semaphore built into it, the dual-ported memory providing a circular buffer using a "get" pointer and a "put" pointer to indicate a starting point and an ending point. Note that two separate clock domains may be associated with each of the channels. Ownership of each of the channels is determined in accordance with a free count semaphore method wherein a free count value indicates a number of bytes available for the CPU 52 to write to. When the CPU 52 writes to one of the channels, the free count semaphore value is decreased. As an example, when the CPU writes to one of the channel units, the associated free count value may be decreased by four where four bytes are written at a time. Likewise, when one of the engines reads from the associated one of the channels, the free count semaphore value is incremented by four. Each channel can be accessed during a single cycle by the CPU 52 and by the associated one of the engines. However, two different processes may not access one location of the channel at the same time. As an example, consider that the first channel 60 includes memory space for storing 64 bytes. In this case, the free count semaphore value is a seven byte value. If the free count value is zero, this indicates that the CPU 52 has filled all of the memory locations, and that all of the filled memory locations are now owned by the graphics engine 58. When the graphics engine reads a portion of the memory space of the channel, ownership of the memory space is provided back to the CPU and the engine increments the free count value.

The CPU 52 operates under control of an OS, and each of the engines also operates in accordance with rules imposed by the OS. The OS uses notification schemes including semaphores to determine ownership of shared resources between a plurality of software processes that function asynchronously and concurrently on the CPU 52, and also between the processes and the engines. Particular groups of the software processes and the engines share associated resources. A semaphore value associated with a particular one of the shared resources may be stored any place in the system 50 that is accessible by each of the execution units sharing access to the particular resource. A semaphore may be stored in a cache location or in a notification data structure of the system memory 54.

Many different methods may be used to communicate notification information, indicating ownership status of a shared resource, between the CPU 52 and the engines 58, 62, and 66. As an example, an interrupt operation may be executed by one of the engines to notify the CPU that the CPU now owns an associated resource such as the memory unit 54. Also, semaphores may be used by the CPU and the engines to notify each other regarding ownership of shared resources. As an example, consider that the OS instructs the disk controller 62 to read a portion of data from a disk (not shown) to the system memory 54. In this case, a process executed by the CPU 52 that requires access to the system memory cannot be executed until the specified data has been successfully transferred from the disk to the system memory by the disk controller 62. Therefore, the OS must ensure that the process is "put to sleep" or the process must stall until the transfer of data from the disk to the system memory is successfully completed.

In accordance with one conventional notification scheme, when the OS instructs the disk controller 62 to transfer data from the disk to the system memory, the OS writes a first semaphore value to a status register located in the disk controller 62, the first semaphore value indicating that the disk controller 62 owns the system memory 54. When the disk controller 62 is done transferring all of the data to the system memory 54, the disk controller 62 must provide notification to the 0s that the disk controller has relinquished ownership of the memory unit. A notification data structure stored in the system memory 54 includes a second semaphore value accessible by both the CPU 52 and the disk controller 62, the second semaphore value indicating the ownership status of the system memory. While the disk controller 62 is transferring data to the system memory 54, the second semaphore value indicates that the system memory is owned by the disk controller, and the CPU spins while sampling the second semaphore value to determine any change in the ownership status. When the disk controller 62 is done transferring all of the data to the system memory 54, the disk controller 62 writes a semaphore value to the 5 notification data structure stored in the system memory to indicate that the OS now has ownership. A problem associated with this conventional resource sharing system is that the CPU 52 "spins" while sampling semaphores while waiting for ownership status of shared resources to change. A significant amount of time and processing power is wasted while the CPU is spinning.

One advantage associated with the I/O system 70 is that it allows for concurrent processing of instructions by the engines 58, 62, and 66. However, a disadvantage associated with the I/O system 70 is that the CPU 52 must provide a significant amount of processing power in order to ensure that the instructions provided to each one of the engines is executed in sequence. The CPU must orchestrate the execution of instructions by each of the engines. So, it is problematic that the CPU 52 must wait for engines to process a number of instructions before providing another one of the engines with additional instructions. As an example, the CPU 52 may execute instructions of an application that coordinates processing of data by different engines. For example, if audio and video data are to be processed by the audio engine 66 and graphics engine 58, it is necessary to synchronize the audio and video data. The audio data rate must be maintained at a constant rate in order to maintain sound quality, and therefore many frames of the video data may need to be deleted or dropped in order to make the video data rate match the audio data rate. Therefore, a programmer must be provided with flexibility in coordinating the processing of data and instructions by the engines.

As the system speed increases, the processing requirements for the CPU 52 increase because more data and instructions need to be pushed to the engines. If the graphics engine stalls waiting for the audio engine, the CPU 52 sets up audio to provide a notification at a certain point. Then the CPU could start loading data and instructions into the graphics engine 72 via the associated channel. So, the CPU 52 is spinning while the audio engine 66 is processing.

FIG. 2B shows a block diagram generally illustrating a second type of conventional computer graphics system at 80 including the CPU 52, system memory 54, bus 56, disk controller, audio engine, and graphics engine. Each of the engines 58, 62, and 66 is communicatively coupled with the CPU and system memory via an associated one of three direct memory access controllers (DMA controllers) 82, 84, and 86. Each of the DMA controllers is operative to read instructions and data from the system memory, and to provide the instructions and data to the associated one of the engines.

With reference to the parallel type I/O interface system 70 (FIG. 2A), the CPU 52 may transmit a first set of commands to the audio engine 66, a second set of commands to the graphics engine 58, and a third set of commands to the disk controller 62. Note that each of the engines may process instructions at a fast rate, and therefore, an engine may stall while waiting for additional instructions to be sent from the CPU. Note further, that if one of the engines is stalled, then the associated channel is stalled. In the parallel type I/O sub-system 70, each of the engines may process instructions concurrently because instructions and data may be provided to each of the engines in parallel.

FIG. 3A shows a block diagram generally illustrating a prior art graphics system at 100. The system 100 includes: the CPU 52; a frame buffer 101; a video engine 102 operative to read data from the frame buffer 101; and a display unit 104 coupled with the video engine 102 as shown by a line 106. The frame buffer 101 includes a first buffer 112 designated BUFFER_0 and a second buffer 114 designated BUFFER_1. A first notification unit 116 stores a notification associated with BUFFER_0, and a second notification unit 118 stores a second notification associated with BUFFER_1. The notification units 116 and 118 are used to determine ownership of buffers 112 and 114, respectively. The CPU 52 renders image data into buffers 112 and 114 as shown at 120, and the video engine 102 scans image data from buffers 112 and 114 after the CPU 52 has finished rendering data as shown at 122. The CPU 52 and the video engine 102 are both operative to access the notifications 116 and 118. Each of the first and second notifications may be implemented in any memory storage unit that is mutually accessible by the CPU and video engine.

While the CPU 52 is rendering data into BUFFER_0, the first notification 116 indicates that BUFFER_0 is owned by the CPU, and the video engine 102 may not access BUFFER_0. When the CPU 52 is done rendering to BUFFER_0, the CPU notifies the video engine that the video engine now owns BUFFER_0 by writing a command to the video engine 102 as indicated by the line 130. Consider now that the CPU 52 renders to BUFFER_1. During this time, the video engine 102 accesses BUFFER_0, but may not access BUFFER_1. After the CPU 52 has finished rendering to BUFFER_1, the CPU notifies the video engine that the video engine now owns BUFFER_1 by writing a command to the video engine as indicated by the line 130. After the video engine finishes accessing BUFFER_0, the video engine provides a notification to the CPU by writing an appropriate value to the semaphore 116. The video engine may also indicate to the CPU that the CPU may begin rendering data to BUFFER_0 by providing a bit in a register, which is readable by the CPU.

FIG. 3B shows a block diagram illustrating a conventional graphics system at 140 wherein the CPU 52 provides instructions and associated parameters to the graphics engine 58 as illustrated by a line 142. Typically, the CPU 52 provides instructions and associated parameters to the graphics engine 58 via the bus 56 using programmed I/O (FIG. 2A) or via the bus 56 using the DMA 82 (FIG. 2B). As described above, the graphics engine 58 renders data into the buffers 112 and 114 of the frame buffer, as illustrated by lines 144 and 146 respectively. Note that the CPU can also render directly to the buffers 112 and 114 of the frame buffer as illustrated by lines 148 and 150 respectively, in the event that the CPU needs to modify certain pixels. The CPU 52 is further operative to control the video engine 102 as illustrated by a line 154.

As in the system 100 (FIG. 3A), NOTIFICATION_0 and NOTIFICATION_1 are used by the video engine 102 to notify the CPU regarding ownership status of BUFFER_0 and BUFFER_1; respectively. Likewise, a third notification unit 160 designated NOTIFICATION_2 is written by the graphics engine 58 and read by the CPU 52 in order to notify the CPU when the graphics engine no longer owns BUFFER_0, and a fourth notification unit 162 designated NOTIFICATION_3 is written by the graphics engine and read by the CPU in order to notify the CPU when the graphics engine no longer owns BUFFER_1.

Typically, the interface between the CPU 52 and the graphics engine 58 includes a first-in first-out (FIFO) buffer (not shown). Also, the interface between the CPU 52 and the video engine 102 typically includes a FIFO (not shown) for buffering instructions and associated parameters. Often, the graphics engine 58 and the video engine 102 are implemented on separate chips.

A problem arises because the CPU 52 cannot program, that is write commands to, the graphics engine 58 to start rendering data into BUFFER_0 until the video engine 102 is done scanning data out of BUFFER_0, and therefore the CPU 52 spins while sampling NOTIFICATION_0 and waiting for the video engine to relinquish ownership of BUFFER_0 back to the graphics engine 58. While the CPU 52 is spinning, the CPU cannot set up a next display list or perform any data transfers for the engines. Because the CPU must orchestrate the use of each of the buffers 112 and 114 by the engines 58 and 102 (as well as any additional engines including the CPU). The CPU must spin while waiting for each engine to finish accessing the buffers, an excess amount of time and processing power of the CPU is wasted. This problem is increased as the length of the FIFOs (not shown) between the CPU 52 and the graphics engine 58, and between the CPU 52 and the video engine 102 increase.

What is needed is an apparatus and method for managing ownership of shared resources wherein each of the execution units sharing ownership of the resource may perform efficiently, and wherein it is not incumbent on a CPU to spend an excess amount of time and processing power orchestrating usage of the shared resources by the execution units.

SUMMARY OF THE INVENTION

It is an object of the present invention to provide an apparatus and method for coordinating accessing of at least one shared resource by a plurality of execution units wherein the execution units may perform concurrently and efficiently.

It is also an object of the present invention to provide coordinated access to a shared resource by a plurality of execution units wherein it is not incumbent on a CPU to spend an excess amount of time and processing power coordinating the accessing of the shared resource.

Briefly, a presently preferred embodiment of the present invention includes a shared resource management system providing coordinated accessing of at least one shared resource by a plurality of execution units. The system includes a memory access control unit operative to access a sequence of instructions stored in a memory unit, the sequence of instructions including a plurality of execution instructions and a plurality of synchronization commands interspersed between associated execution instructions. The system also includes: a first execution unit communicatively coupled with the memory access control unit for receiving associated execution instructions from the memory access control unit via a first channel; and a second execution unit communicatively coupled with the memory access control unit for receiving associated execution instructions from the memory access control unit via a second channel, the first and second execution units being capable of accessing at least one shared resource. The memory access control unit is responsive to the synchronization commands and operative to access at least one semaphore value stored in a semaphore storage location, the semaphore value being associated with a shared resource and indicating an ownership status for the shared resource. The control unit is operative to manage the flow of the execution instructions to the first and second execution units via the first and second channels in order to cause the execution units to cooperate in their accessing of the shared resource.

The synchronization commands include: an acquire command having an associated acquire value, the acquire command indicating that the associated execution unit may acquire ownership of a shared resource upon a determination that the associated acquire value has a predetermined relationship with an associated semaphore value; and a release command having an associated release value indicating that the associated execution unit is to relinquish ownership of the shared resource after the associated execution unit is done accessing a shared resource.

The memory access control unit is operative to perform a shared resource ownership acquisition process in response to an acquire command. The acquire process includes the steps of: determining whether the received acquire value has a predetermined relationship with an associated current semaphore value; and if the received acquire value has a predetermined relationship with the associated current semaphore value, providing a portion of the execution instructions associated with the received acquire command to the associated execution unit via the associated channel. The memory access control unit is also operative to perform a shared resource ownership release process in response to a release command. The release process includes the steps of: determining whether the associated execution unit is done processing a portion of the associated execution instructions associated with a previously received acquire command; and if the execution unit is done, writing the associated release value to an associated semaphore storage location.

The memory access control unit includes: a register for storing the acquire values and the release values; and a control logic unit coupled with the register. In one embodiment, the first and second execution units are each capable of accessing a plurality of shared resources, each of the resources having an associated semaphore. In this embodiment, each of the synchronization commands has an associated pointer value indicating an associated semaphore, and the memory access control unit includes a third register for storing the pointer values.

An important advantage of the shared resource management system of the present invention is that it is not incumbent on a central processing unit to coordinate accessing of the shared resources by sampling semaphore values and spinning while the execution units finish executing instructions.

Another important advantage of the shared resource management system of the present invention is that ownership of a shared resource is transferred between the execution units quickly, and the execution units may process instructions efficiently.

The foregoing and other objects, features, and advantages of the present invention will be apparent from the following detailed description of the preferred embodiment, which makes reference to the several figures of the drawing.

IN THE DRAWING

DETAILED DESCRIPTION OF THE PREFERRED EMBODIMENTS

Figure 1A:
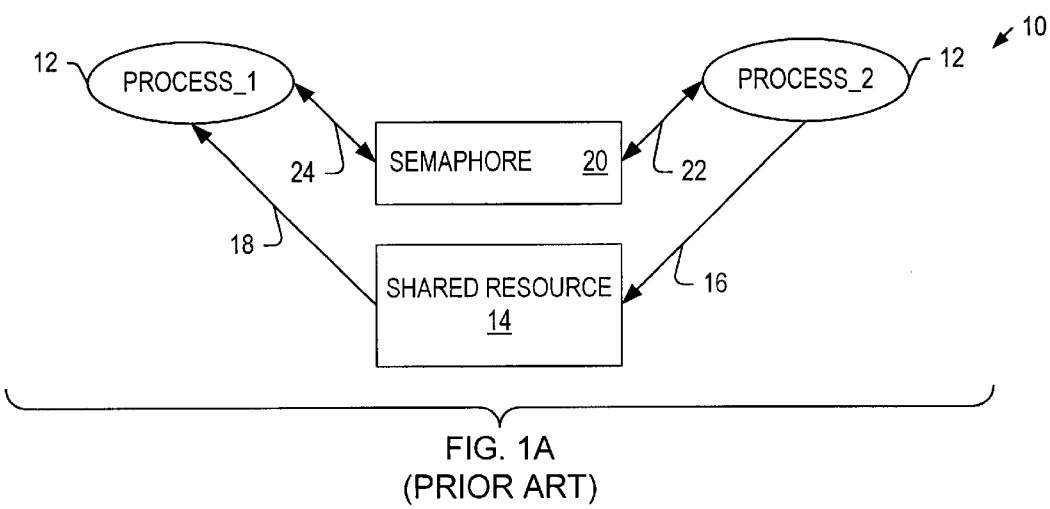
FIGS. 1A through 1C are generalized block diagrams illustrating examples of conventional resource sharing systems using a semaphore.
Figure 1B:
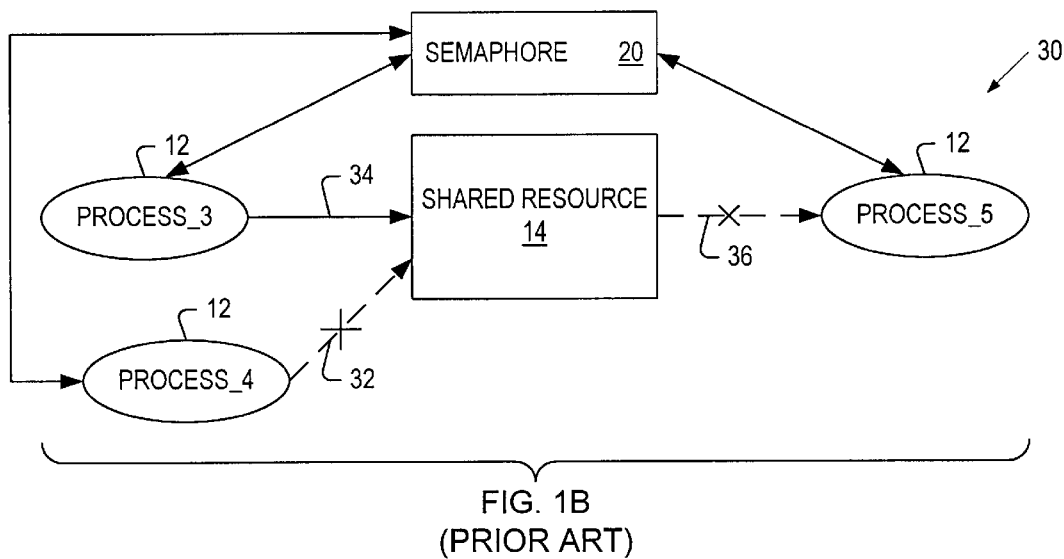
Figure 1C:
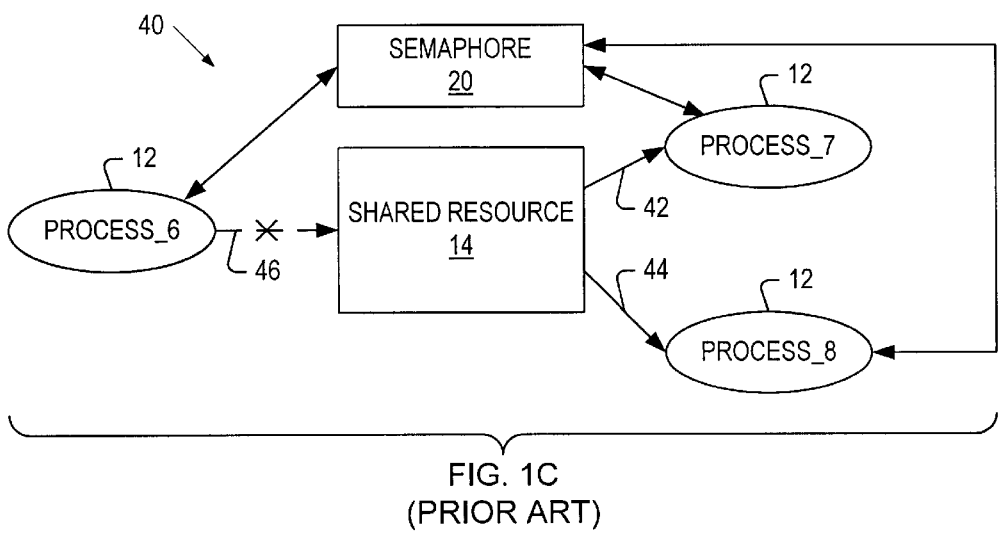
Figure 2A:
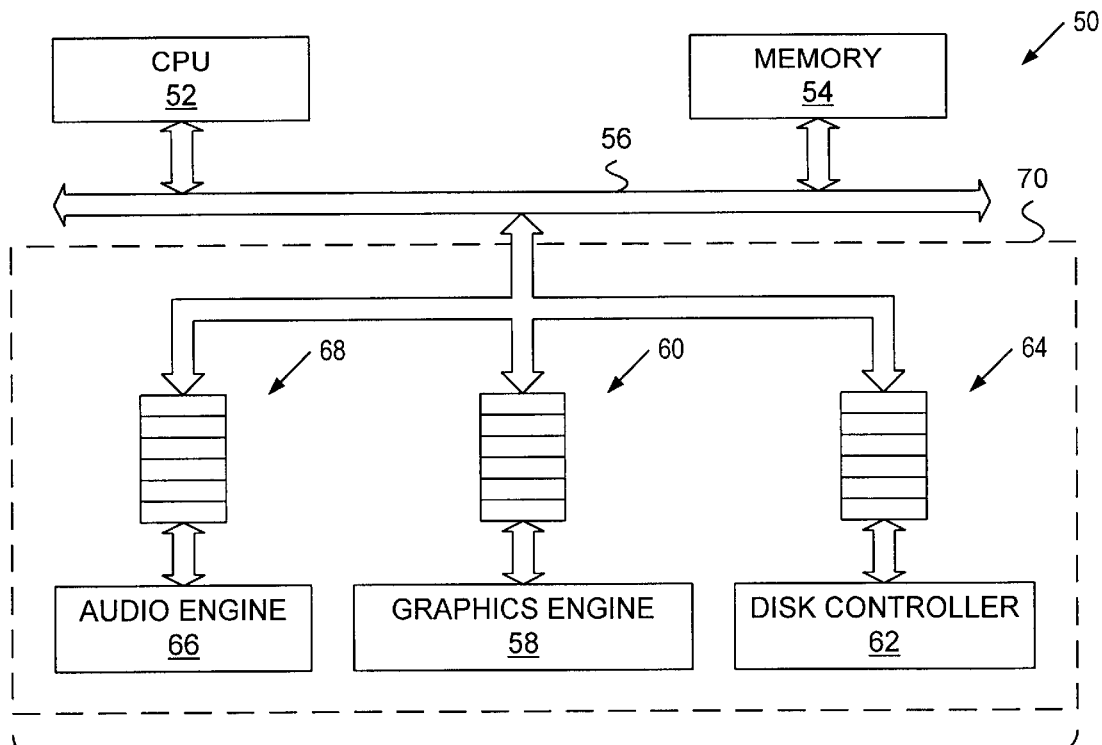
FIGS. 2A and 2B are block diagrams generally illustrating two conventional types of interfaces for coupling a plurality of engines to a system bus in a prior art graphics system.
Figure 2B:
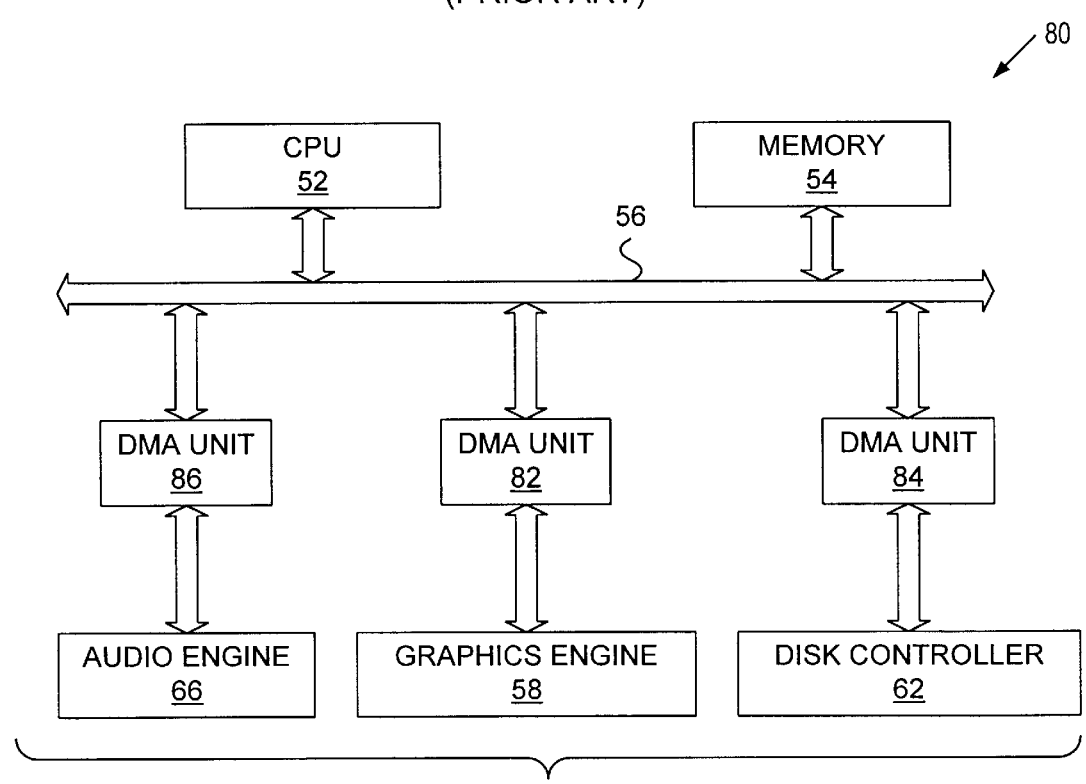
Figure 3A:
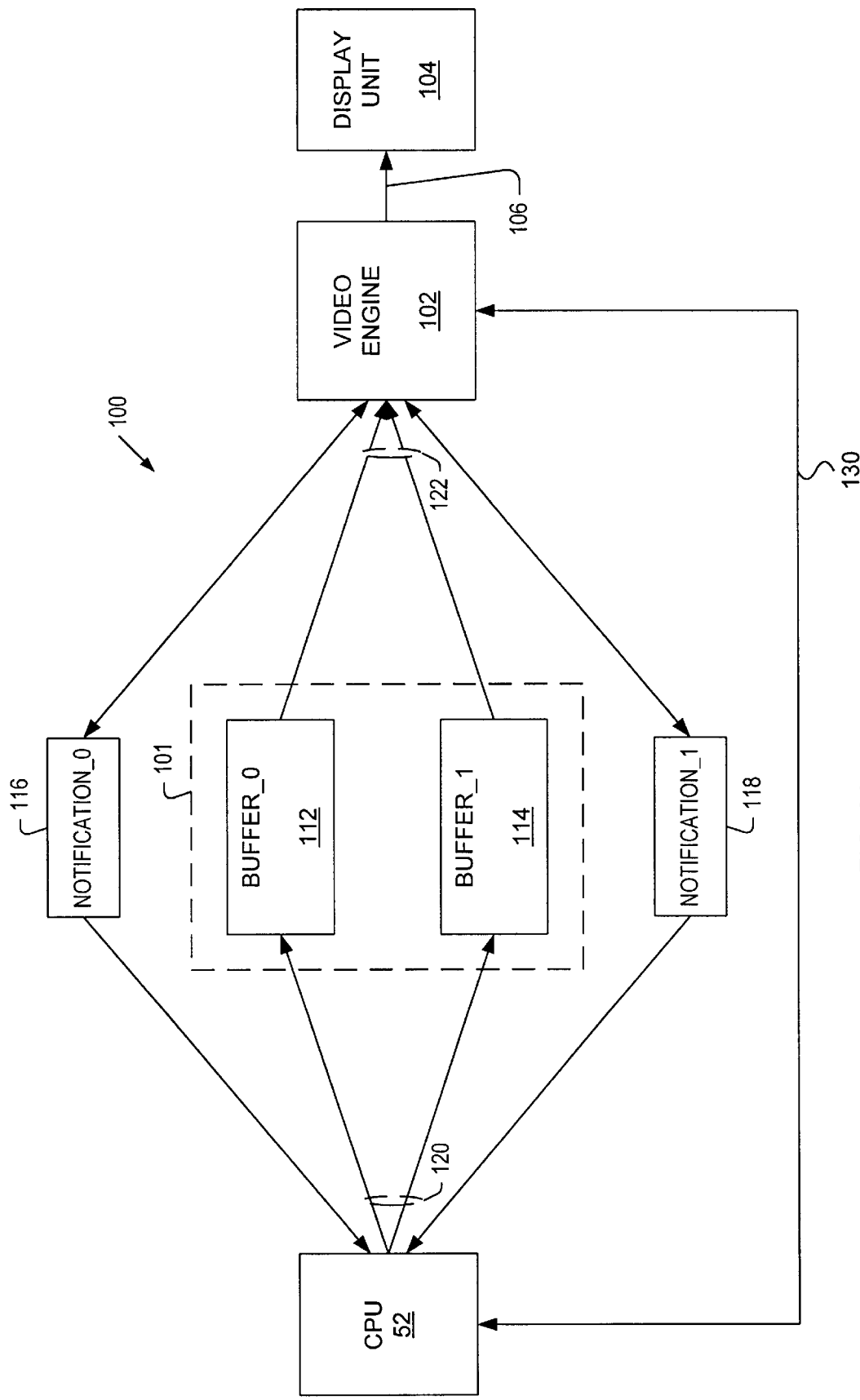
FIGS. 3A and 3B are block diagrams generally illustrating conventional graphics systems wherein a plurality of execution units share access to a double buffer in accordance with conventional resource sharing methods using a semaphore.
Figure 3B:
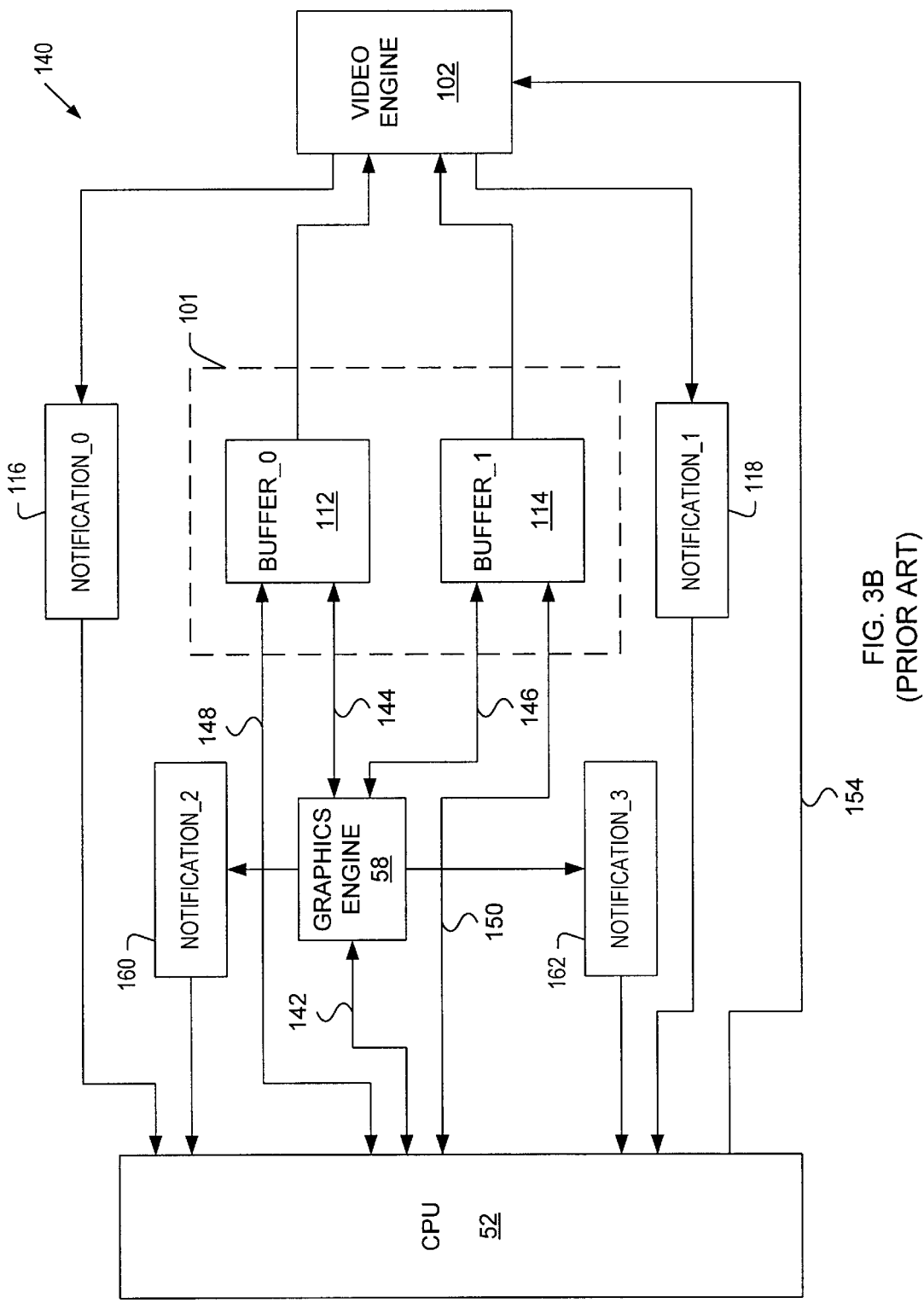
Figure 4:
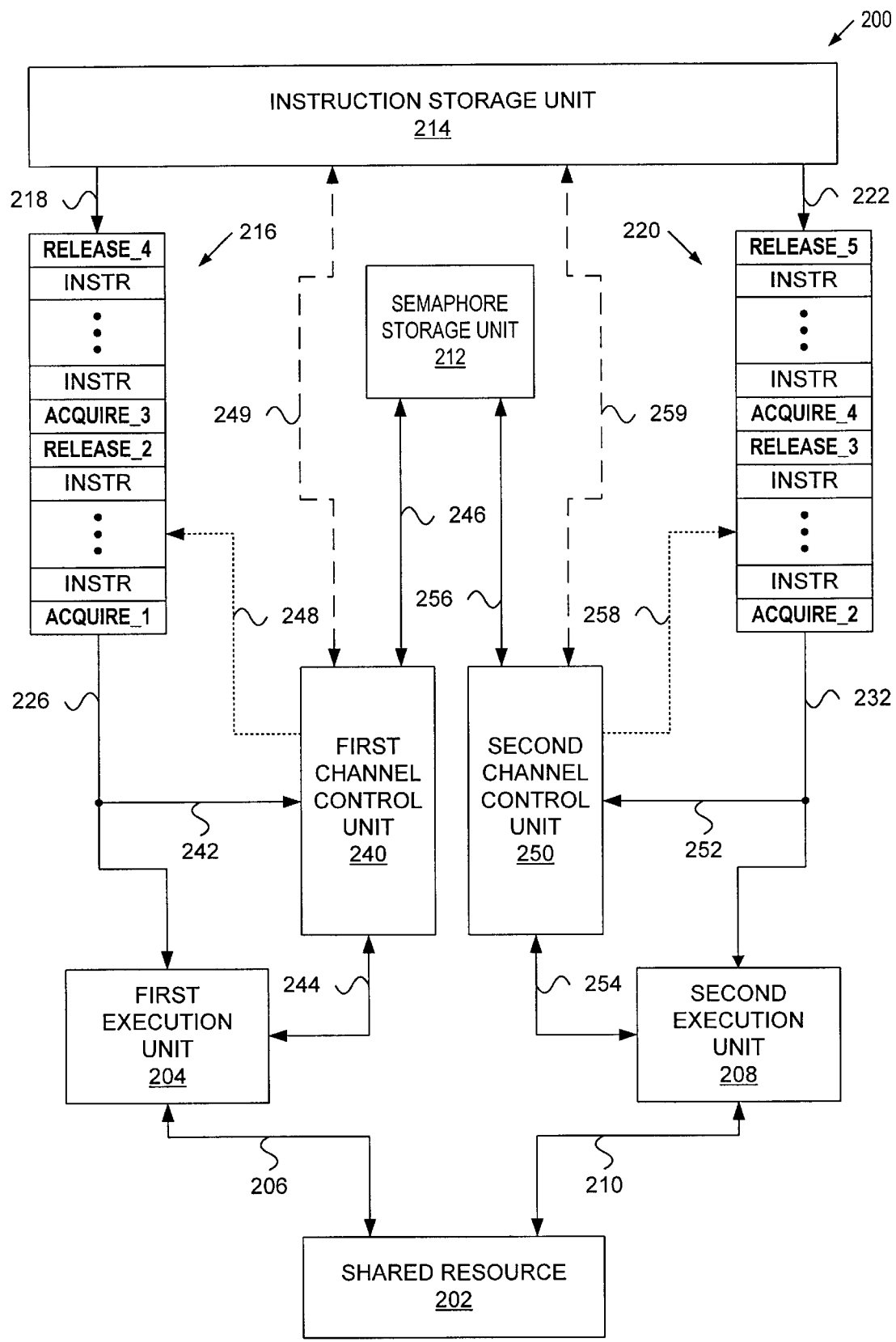
FIG. 4 is a schematic circuit block diagram generally illustrating a shared resource management system in accordance with the present invention.

FIG. 4 shows a schematic circuit block diagram generally illustrating a shared resource management system at 200 in accordance with the present invention. The system 200 includes: a resource 202 that is shared by at least one execution unit including processing units and hardware engines which need to access information stored in the shared resource; a first execution unit 204 operative to access, that is read from and write to, the shared resource 202 as illustrated by a line 206; a second execution unit 208 operative to access the shared resource as illustrated by a line 210; a semaphore storage unit 212 for storing at least one semaphore value associated with at least a portion of the memory space of the shared resource 202; an instruction storage unit 214 for storing a plurality of instructions including execution instructions to be executed by the associated execution unit 204, 208, and synchronization commands interspersed between associated execution instructions, the synchronization commands for causing the first and second execution units to cooperate in their access of the shared resource 202 in accordance with a synchronized process that also uses semaphore values stored in the semaphore storage unit 212 as further explained below; a first channel 216 for receiving a first plurality of the instructions stored in the instruction storage unit 214 as indicated by a line 218, the first plurality of instructions including a first set of the execution instructions and a first set of the synchronization commands; and a second channel 220 for receiving a second plurality of the instructions stored in the instruction storage unit as indicated by a line 222, the second plurality of instructions including a second set of the execution instructions, and a second set of the synchronization commands. In an alternative embodiment of the present invention, the shared resource management system 200 may include only one execution unit running under a time sliced operating system.

In one embodiment of the present invention, the instructions are transferred from the instruction storage unit 214 to the first and second channels 216 and 220 by a control unit such as a processing unit (not shown). In another embodiment, the instructions are generated by a processing unit (not shown) and provided directly to the channels 216 and 220. In varying embodiments of the present invention, each of the first and second execution units 204 and 208 may be a software process executed by a processing unit, or a hardware engine such as a graphics engine, an audio engine, a video engine, or a disk controller. In varying embodiments of the present invention, the instruction storage unit 214 may be any type of memory storage unit such as a system memory. Also, in varying embodiments, the semaphore storage unit 212 may be implemented by the same memory storage device that is used to implement instruction storage unit 214, or may be any other memory storage device such as a mass storage device, a RAM, or a single register unit for storing a single bit. Further, in varying embodiments of the present invention, the shared resource 202 may be a register unit for storing a number of bits of data, or a memory storage device for storing a large data structure.

The synchronization commands include: an acquire command indicating that ownership of the shared resource 202 is to be assumed by the associated execution unit if an associated acquire value has a predetermined relationship with (e.g., is equal to) a semaphore value stored in the semaphore unit 212; and a release command indicating that ownership of the shared resource 202 is to be released by the associated execution unit if an associated release value has a predetermined relationship with a value stored in the semaphore unit 212.

The resource management system 200 further includes: a first channel control unit 240 being responsive to the first set of synchronization commands received from the instruction storage unit via the first channel 216 as indicated by a line 242, and also being responsive to a first idle signal provided by the first execution unit 204 as indicated by a line 244, the first idle signal for indicating that the first execution unit is idle (that is done executing a portion of the first set of execution commands associated with one of the synchronization commands), the first channel control unit 240 also being operative to access the semaphore storage unit 212 as indicated by a line 246 in order to read and write semaphore values.

The system 200 further includes a second channel control unit 250 for receiving the second plurality of synchronization commands from the instruction storage unit via the second channel 220 as indicated by a line 252, and also being responsive to a second idle control signal provided by the second execution unit 208 as indicated by a line 254, the second idle signal indicating that the second execution unit 208 is done processing an associated portion of the second set of execution instructions that are associated with one of the synchronization commands, the second channel control unit 250 being operative to read and write semaphore values stored in the semaphore storage unit 212 as indicated by a line 256.

The execution units 204 and 208 are both operative to access the shared resource 202 under control of the channel control units 240 and 250 based on the synchronization commands. Note that the system 200 in accordance with the present invention may include any integer number N of execution units operative to access the shared resource 202, each of the N execution units having an associated channel control unit, and an associated channel. Each of the execution units may share access to any integer number M of shared resources. Each of the M shared resources may include a portion of a memory space or a single memory device. The shared resources may also include processing resources of a processing unit.

In a first embodiment of the resource management system 200, each of the first and second channel control units 240 and 250 is a programmed input/output (PIO) control unit, and each of the first and second channels 216 and 220 is implemented by a channel unit including a first-in first-out (FIFO) and a blocking unit responsive to an associated channel control signal 15 provided by the associated PIO control unit for managing the flow of the execution instructions from the instruction storage unit 214 to the associated execution unit as further explained below. In this embodiment, the first channel control unit 240 is operative to provide a first channel control signal to the first channel unit 216 as indicated by a dashed line 248, and the second channel control unit 250 is operative to provide a second channel control signal to the second 20 channel unit 220 as indicated by a dashed line 258. A specific implementation of the system 200 using the PIO channel control units 240 and 250 is further explained below.

In a second embodiment of the resource management system 200, each of the first and second channel control units 240 and 250 is implemented by a direct memory access (DMA) channel control unit that is operative to access the instructions stored in the instruction storage unit 214 as indicated by dashed lines 249 and 259 respectively in order to manage the flow of instructions to the first and second execution units 204 and 208 respectively via the associated one of the channels 216 and 220 which are virtual channels in this DMA channel control embodiment. A specific implementation of the DMA channel control unit embodiment of the system 200 is further explained below. In the DMA channel control embodiment, the blocking and unblocking functions are provided by the DMA channel control unit.

Figure 5A:
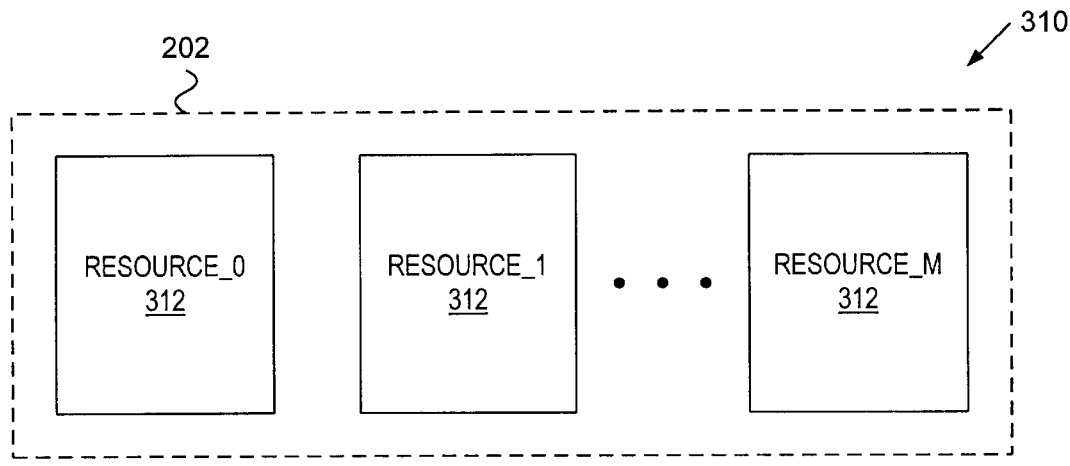
FIGS. 5A and 5B are block diagrams generally illustrating a plurality of resources that may be shared by the execution units of FIG. 4, and a plurality of semaphores each being associated with one of the resources.

FIG. 5A shows a block diagram illustrating contents of the shared resource 202 (FIG. 4) at 310 in accordance with one embodiment of the present invention. In the depicted embodiment, the shared resource 202 includes a plurality of M shared resources 312 designated RESOURCE_0, RESOURCE_1, ... RESOURCE_M, each of the resources 312 being shared by the first and second execution units 204 and 208 (FIG. 4) in accordance with the present invention as further explained below.

Figure 5B:
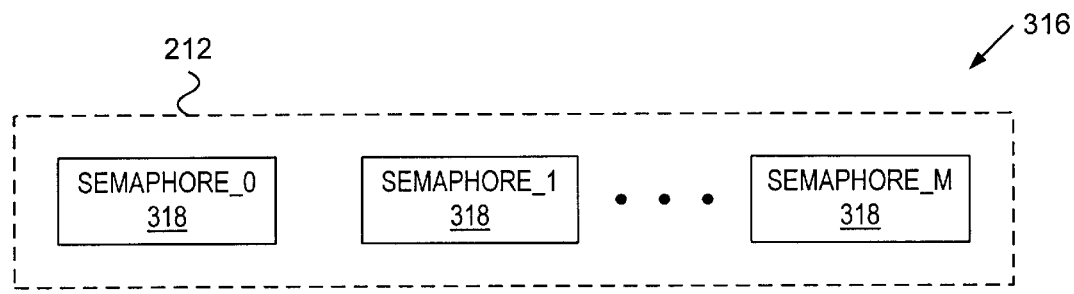

FIG. 5B shows a block diagram generally illustrating the contents of the semaphore unit 212 in accordance with one embodiment of the present invention at 316. In the depicted embodiment, the semaphore storage unit 212 includes a plurality of semaphore storage locations 318 for storing a plurality of M semaphore values designated SEMAPHORE_0, SEMAPHORE_1, ... SEMAPHORE_M. Each of the semaphores is associated with one of the shared resources 312 (FIG. 5A). The semaphore values are further explained below.

Figure 5C:
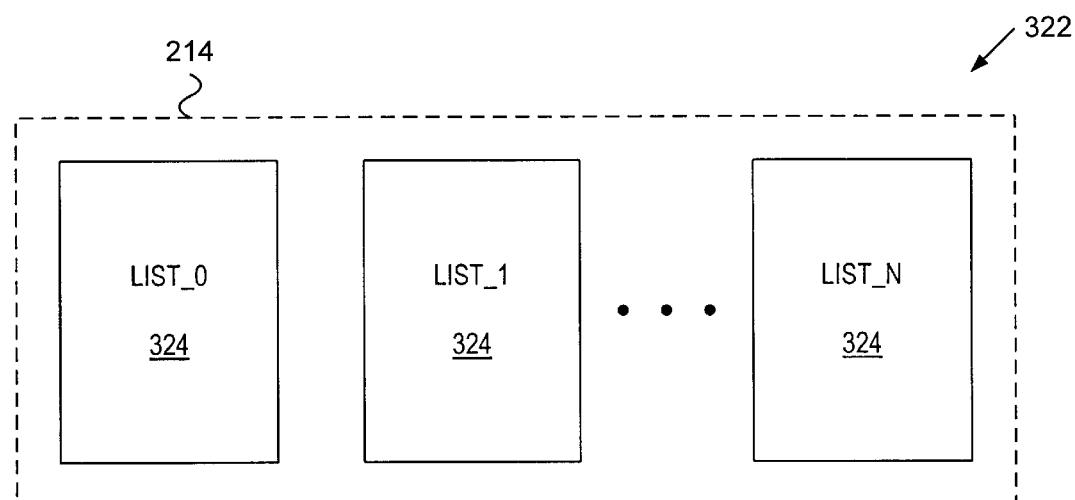
FIG. 5C shows a block diagram generally illustrating a plurality of instruction lists each being associated with one of the execution units of FIG. 4.

FIG. 5C shows a block diagram generally illustrating contents at 322 of the instruction storage unit 214 in accordance with one embodiment of the present invention wherein the instruction storage unit 214 includes a plurality of instruction lists 324 designated LIST_0, LIST_1, ... LIST_N. Each of the instruction lists 324 is associated with one of the execution units 204, 208 (FIG. 4). Each of the instruction lists 324 includes an associated set of execution instructions to be executed by the associated one of the execution units, and an associated set of synchronization commands to be processed by the associated channel control unit as further explained below.

Figure 6:
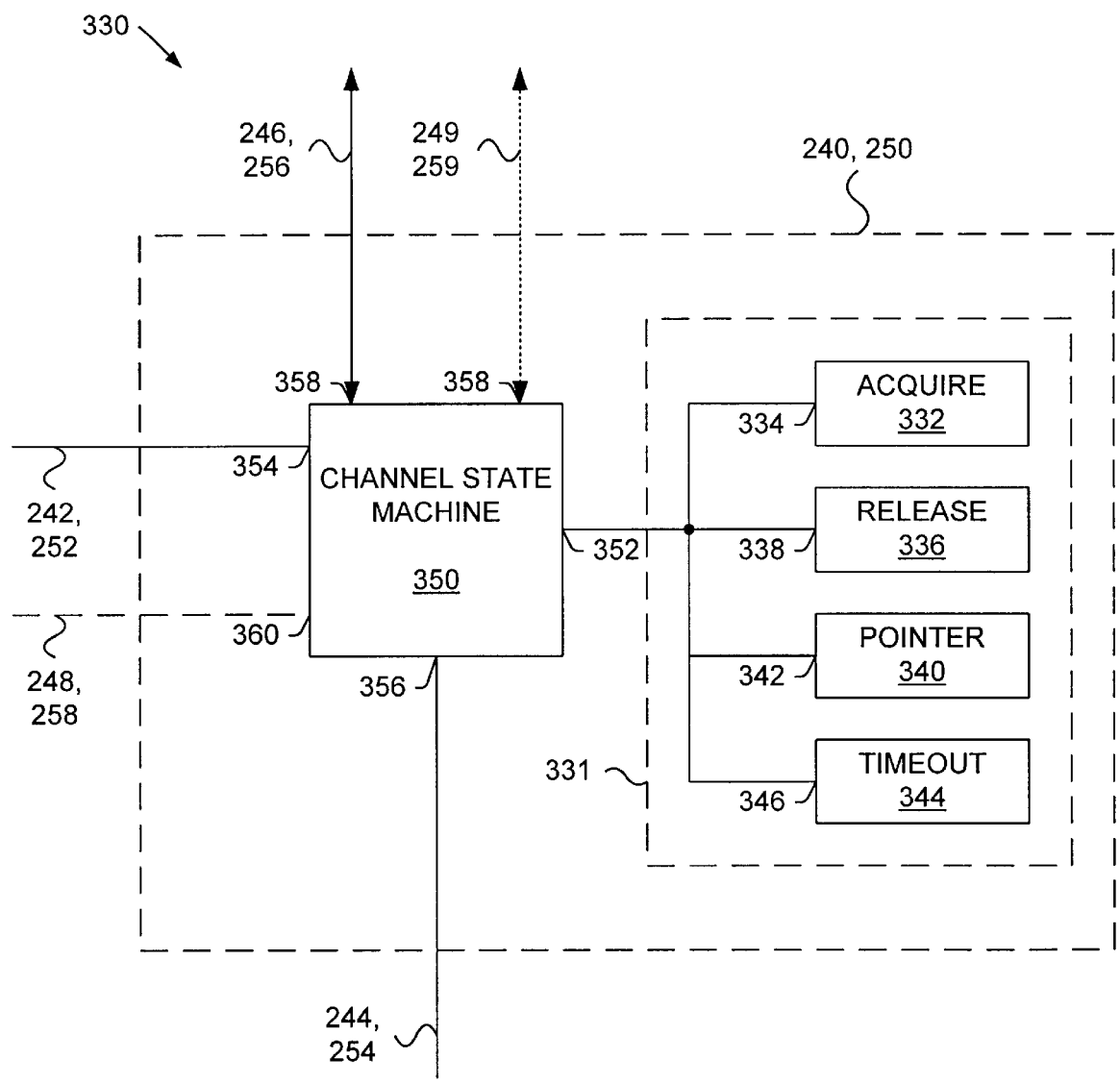
FIG. 6 is a schematic circuit block diagram illustrating details of one of a plurality of channel control units used in the system of FIG. 4.

FIG. 6 shows a schematic circuit block diagram generally illustrating details of each of the channel control units 240, 250 (FIG. 4) at 330. In one embodiment, each of the channel control units 240, 250 includes at least one set of registers 331 having: an acquire register 332 for storing acquire values, and having a port 334; a release register 336 for storing release values, and having a port 338; a pointer register 340 for storing pointer values, and having a port 342; and a timeout register 344 for storing a predetermine time out value, and having a port 346. Each of the channel control units 240, 250 also includes a state machine 350 having a port 352 communicatively coupled with ports 334, 338, 342, and 346 of the acquire register, release register, pointer register, and timeout register. In an alternative embodiment, a single register used to implement both the acquire register 332 and the release register 336 for storing both the acquire values and release values. A single register may be used because the resource release and acquire process of the present invention is serial as further explained below. Each of the channel control units 240, 250 also includes: a port 354 for receiving associated synchronization commands via the associated channel; a port 356 for receiving an associated one of the idle signals from an associated one of the execution units 204 and 208 (FIG. 4); and a port 358 coupled with the semaphore storage unit 212 (FIG. 4) for accessing associated semaphore values.

In the PIO channel control embodiment, the channel state machine 350 further includes a port 360 communicatively coupled with the associated one of the channel units 216 and 220 (FIG. 4). In the PIO embodiment, the channel state machine 350 is operative to provide the channel control signal to the blocking mechanism of the associated one of the channels 216, 220 (FIG. 4) in order to manage the flow of execution instructions to the associated execution unit.

In the DMA channel control embodiment, the channel state machine 350 further includes a port 358 communicatively coupled with the instruction storage unit 214 (FIG. 4) as indicated by the associated line 249, 259 (FIG. 4). In this embodiment, the channel state machine 350 is operative to access instructions stored in the instruction storage unit 214 (FIG. 4) as further explained below. In the DMA channel control embodiment, the channel control unit 240, 250 includes a set of registers 331 for each virtual channel supported by the DMA channel control unit as further explained below.

Figure 7A:
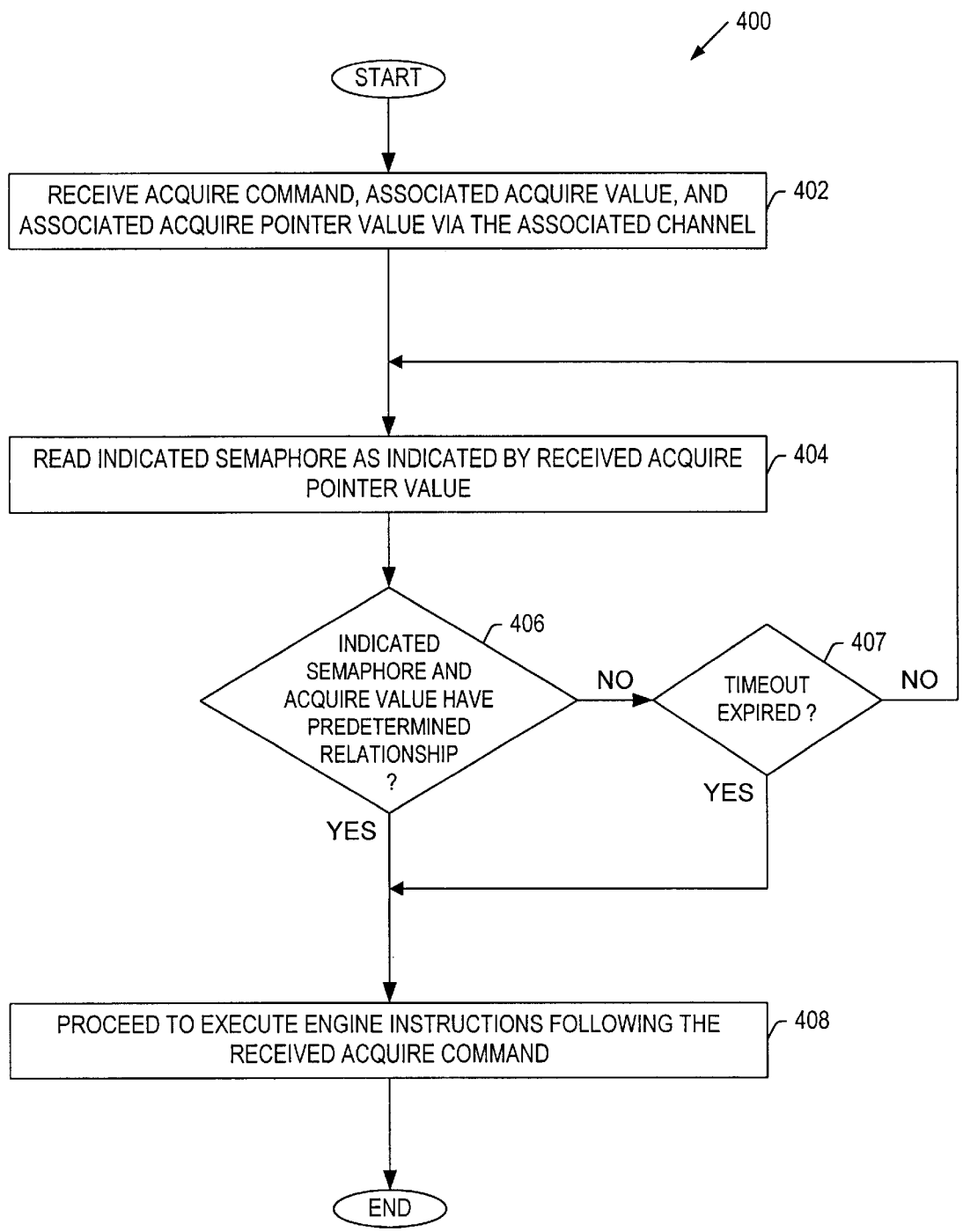
FIGS. 7A and 7B are flow diagrams illustrating an acquire process and a release process respectively in accordance with a resource sharing method of the present invention.

FIG. 7A shows a flow diagram illustrating a resource acquire process at 400 of a resource sharing process in accordance with the present invention. The process 400 is performed by each of the channel control units 240, 250 (FIG. 4) in response to receiving an acquire command as further explained below. Note that there are some functional differences between the operation of the PIO type channel control units and the DMA type channel control units as explained below. The acquire process 400 begins with step 402 in which the channel control unit receives an acquire command, an associated acquire value, and an associated acquire pointer value via the associated one of the channels. In the PIO channel control unit embodiment, the acquire value and associated parameters are transferred from the instruction storage unit 214 (FIG. 4) to the associated channel control unit 240, 250 (FIG. 4) via the associated channel 216, 220 (FIG. 4) by an external device such as a processing unit. In DMA channel control unit embodiment, the channel state machine 350 (FIG. 6) is operative to access the instruction storage unit 214 (FIG. 4) directly to receive the acquire command, acquire value and associated parameters. Also in step 402, in both embodiments, the channel control unit stores the received acquire value in its acquire register, and the received acquire pointer value in its pointer register.

In step 404, the channel control unit reads the indicated semaphore value stored in the semaphore storage unit 212 (FIG. 4), the indicated semaphore value being specified by the received acquire pointer value. In step 406, the channel control unit determines whether the indicated semaphore value has a predetermined relationship with the acquire value received in step 402. In accordance with the present invention, the predetermined relationship between the semaphore value and acquire value may be any predetermined relationship (e.g., an exact match, that is the semaphore value equals the associated acquire value). If it is determined at 406 that the predetermined relationship is satisfied between the indicated semaphore value and the acquire value, it is assumed that the associated execution unit now owns the shared resource 202 (FIG. 4), and the process proceeds to step 408 in which the shared resource is acquired and the channel control unit executes instructions associated with the received acquire command as further explained below. Alternatively, the process proceeds to 407 at which it is determined whether a predetermined time out period has expired. Each of the channel control units 240, 250 (FIG. 4) is operative to determine expiration of the predetermined time out period by accessing a predetermined time out value stored in the time out register 344 (FIG. 6).

If it is determined at 407 that the time out period has not expired, the process repeats steps 404 and 406. Alternatively, if the time out period has expired, the process proceeds to step 408 accessing the shared resource even though the predetermined relationship is determined at 406 not to be satisfied. This situation occurs if a previous process that previously had ownership of the shared resource does not release the resource by writing an appropriate release value to the appropriate semaphore as a result of the process dying, or failing to finish executing. Note that although corruption of data could occur in this case, it is assumed that the previous process relinquishes ownership of the shared resource as a result of the process dying. Proceeding with step 408 when the time out period has expired, even though the predetermined relationship is determined not to be satisfied, is necessary in order to ensure that the resource acquire process is not stalled indefinitely if the semaphore value is never set to satisfy the predetermined relationship with the acquire value.

In step 408, the channel control unit executes instructions associated with the received acquire command, the execution instructions being provided via the associated channel. In the PIO channel control unit embodiment, the channel control unit controls the associated blocking mechanism of the associated one of the channel units 216, 220 (FIG. 4) to unblock the associated channel to provide the execution instructions associated with the received acquire command to the associated execution unit via the associated channel unit. In the DMA channel control unit embodiment, the channel state machine 350 (FIG. 6) accesses a plurality of execution instructions associated with the received acquire command directly from the instruction storage unit 214 (FIG. 4), and provides the associated execution instructions to the associated execution unit via the associated virtual channel. After executing step 408, the acquire process ends.

Figure 7B:
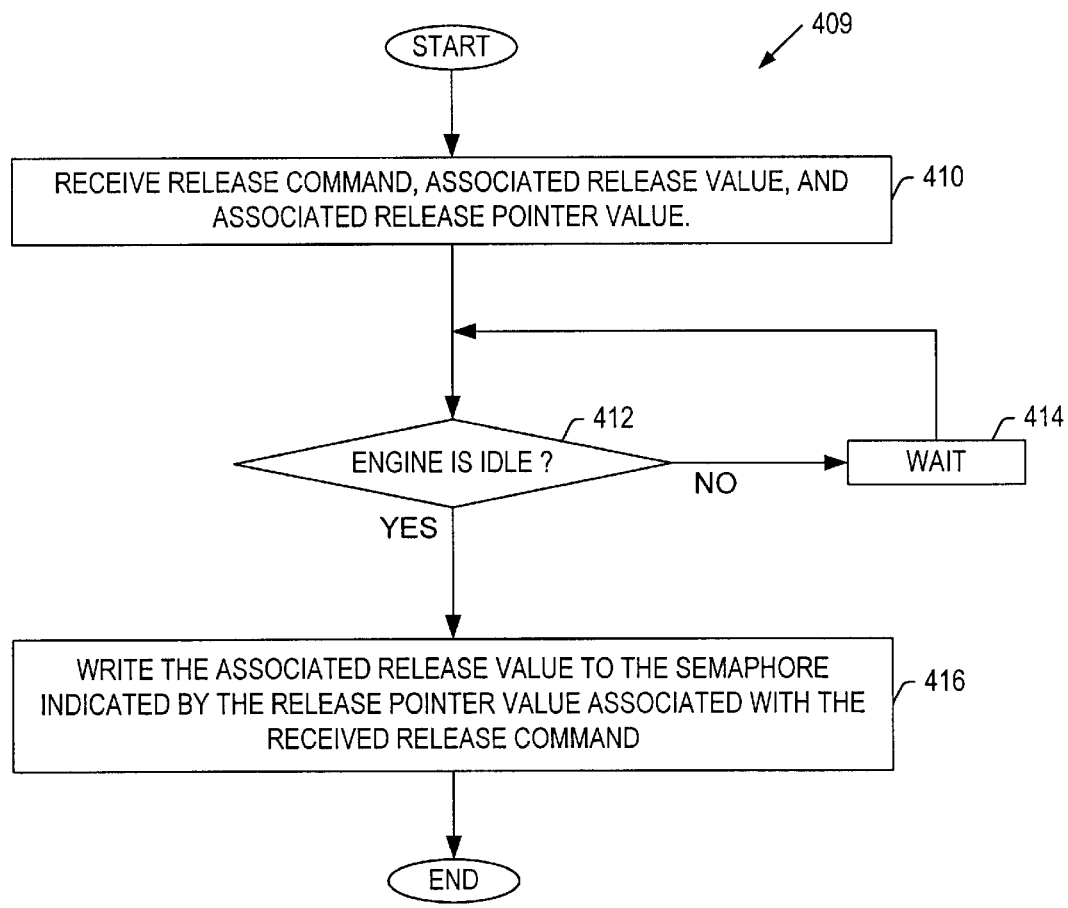

FIG. 7B shows a flow diagram illustrating a resource release process at 409 of the resource sharing process of the present invention. The process 409 is performed by each of the channel control units 240, 250 (FIG. 4) in response to receiving a release command as further explained below. In step 410, the channel control unit receives a release command, an associated release value, and an associated release pointer value indicating a semaphore value 318 (FIG. 5B) associated with one of the shared resources 312 (FIG. 5A). The channel control unit stores the received release value in its release register and stores the received pointer value in its pointer register. From step 410, the process proceeds to 412 at which the channel control unit determines whether the associated one of the execution units is idle based on the idle signal provided by the associated execution unit as described above. If it is determined at 412 that the associated execution unit is not idle, the process proceeds to step 414 in which the channel control unit waits before making the determination at 412 again. Alternatively, it is assumed that the associated execution unit is done accessing the associated shared resource, and the process proceeds to step 416 in which the channel control unit writes the associated release value to the semaphore indicated by the associated release pointer value. After executing step 416, the release process ends.

Figure 8A:
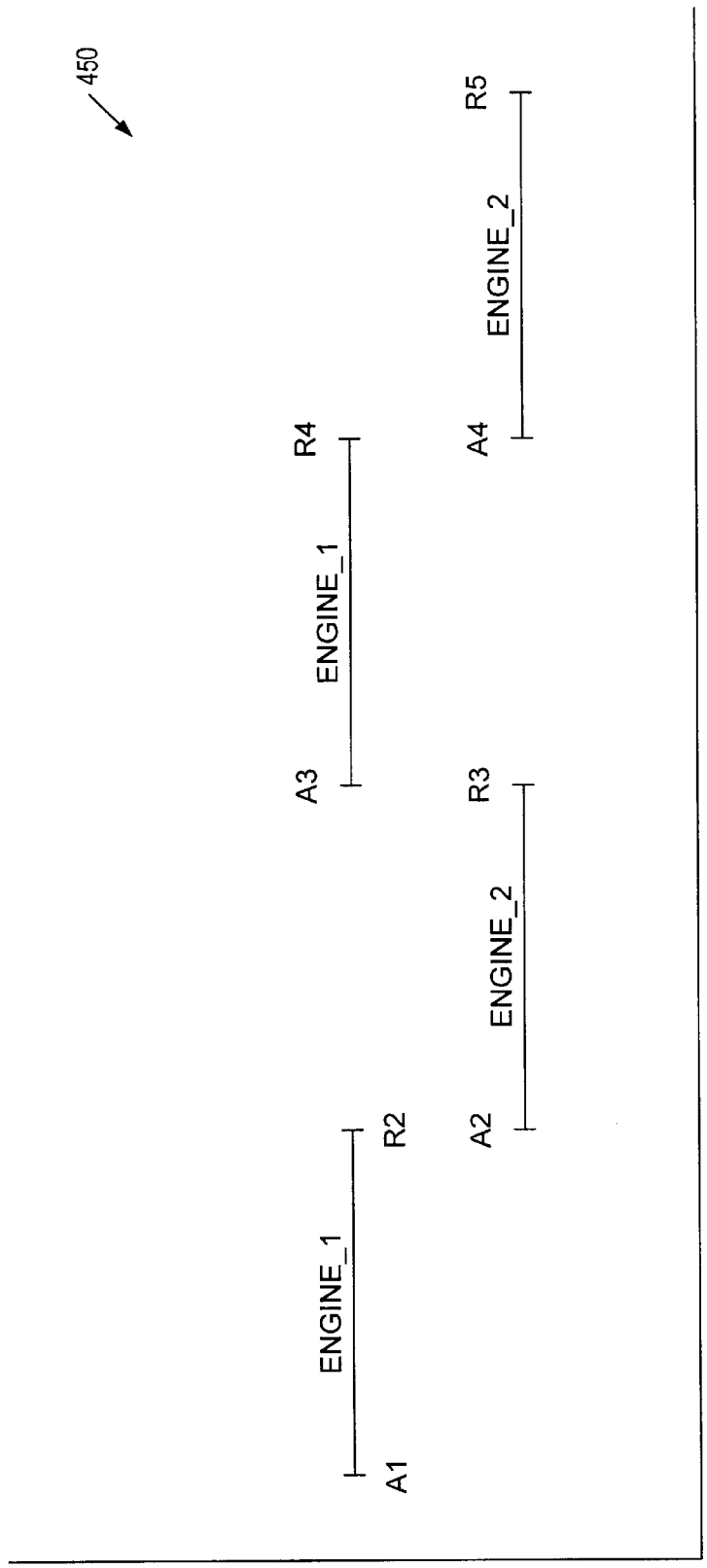
FIGS. 8A and 8B are timing diagrams illustrating exemplary resource sharing processes in accordance with the present invention.

FIG. 8A shows a timing diagram at 450 illustrating a process wherein the first and second execution units 204 and 208 (FIG. 4) share a single resource. In the depicted example, a first execution unit designated ENGINE_1 acquires ownership of the resource in response to a validated first acquire command having an associated acquire value A1, and proceeds to execute a plurality of instructions associated with the first acquire command, and subsequently relinquishes ownership to the shared resource in response to a release command having an associated release value R2. The release value R2 is written to the semaphore storage location in accordance with the process described above. A second execution unit designated ENGINE_2 subsequently acquires ownership of the resource in response to a validated second acquire command having an associated acquire value A2, and begins executing instructions associated with the second acquire command. The process continues in a like manner with the semaphore value being increased with each transfer of ownership of the shared resource. In one embodiment of the present invention, the semaphore value is a 32 byte value.

Figure 8B:
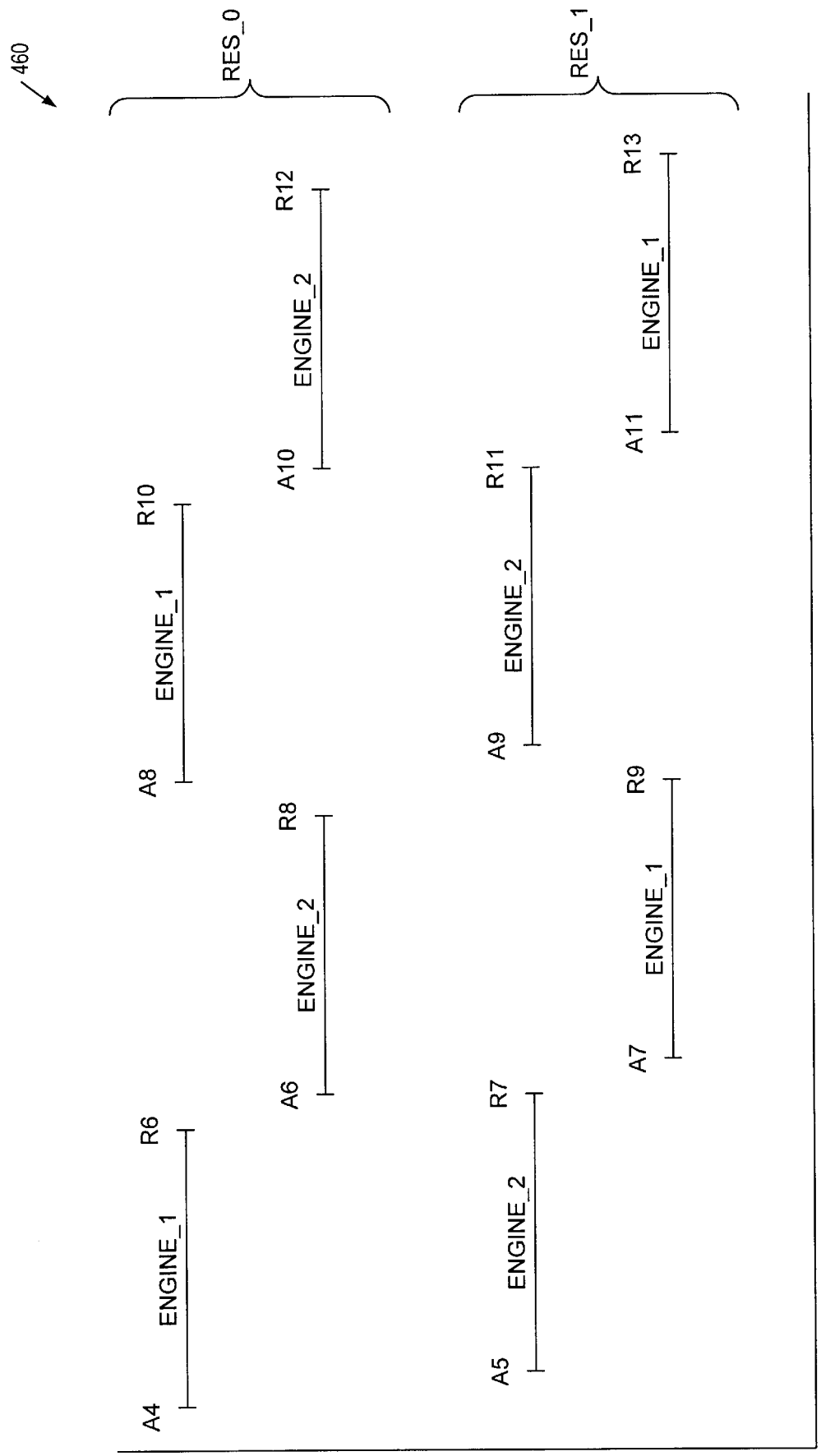

FIG. 8B shows a timing diagram at 460 illustrating a process wherein the first and second engines share two resources designated RES_0 and RES_1. In the depicted example, a control unit associated with ENGINE_1 receives a first acquire command having an associated acquire value A4 and an associated pointer value indicating a semaphore associated with RES_0. Upon validation of the first acquire command as described above, ENGINE_1 acquires ownership of RES_0 and proceeds to execute a plurality of instructions associated with the first acquire command. Concurrently, a control unit associated with ENGINE_2 receives a second acquire command having an associated acquire value A5 and an associated pointer value indicating a semaphore associated with RES_1 . Upon validation of the second acquire command as described above, ENGINE_2 acquires ownership of RES_1and proceeds to execute a plurality of instructions associated with the second acquire command.

After executing the instructions associated with the first acquire command, ENGINE_1 relinquishes ownership of RES_0 in response to a release command having an associated release value R6. The release value R6 is written to the semaphore storage location in accordance with the process described above. ENGINE_2 subsequently receives a third acquire command having an associated acquire value A6 and an associated pointer value indicating a semaphore associated with RES_0. Upon validation of the third acquire command as described above, ENGINE_2 acquires ownership of RES_0 and proceeds to execute a plurality of instructions associated with the third acquire command. The process continues in a like manner with the semaphore storage value increasing with each transfer of ownership of the shared resource. Note that one of the engines may receive several acquire commands in a row for acquiring access to several different resources.

Figure 9:
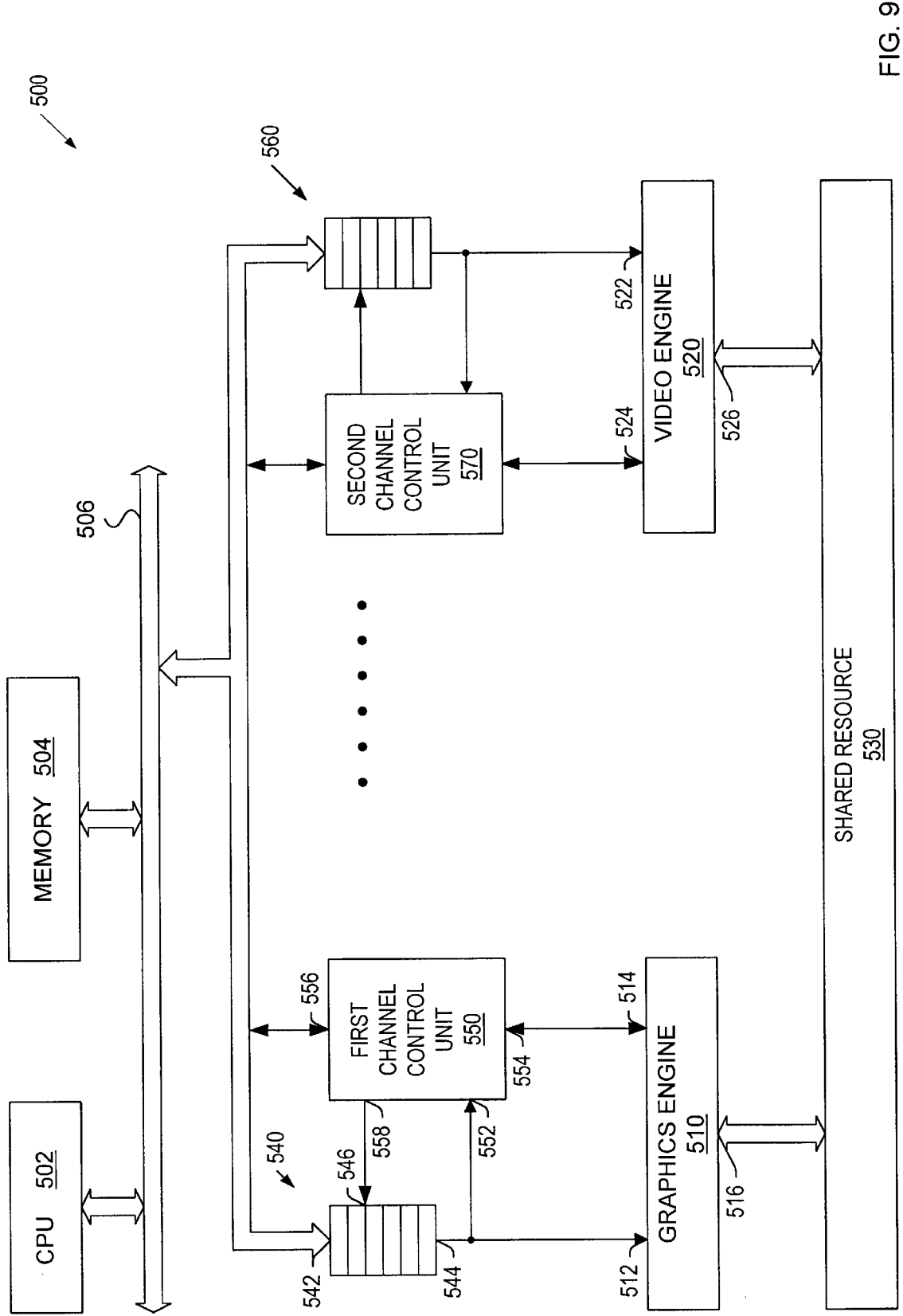
FIG. 9 is a schematic block diagram generally illustrating a first embodiment of a computer graphics system having a plurality of execution units sharing access to a resource in accordance with the present invention.

FIG. 9 shows a schematic circuit block diagram generally illustrating a computer graphics system at 500 in accordance with the present invention. The system 500 includes: a CPU 502; a system memory 504 for storing a plurality of instructions including execution instructions, and a plurality of synchronization commands interspersed between associated execution instructions, the system memory 504 being communicatively coupled with the CPU 502 via a system bus 506; a graphics engine 510 having a port 512 for receiving a plurality of execution instructions from the system memory 504 as further explained below, a port 514, and a port 516 communicatively coupled with a shared resource 530 as further explained below; and a video engine 520 having a port 522 for receiving execution instructions from the system memory 504 as further explained below, a port 524, and a port 526 communicatively coupled with the shared resource 530.

The system 500 further includes: a first channel unit 540 having an input port 542 for receiving a first set of instructions including a first set of execution instructions, and a first set of synchronization commands from the system memory 504 via the system bus 506, a second port 544 for providing the first plurality of instructions, and an input port 546 for receiving a channel control signal for managing the flow of the first set of execution instructions via the first channel unit 540 to port 512 of the graphics engine 510; and a first channel control unit 550 having a port 552 for receiving the first plurality of synchronization commands from port 544 of the first channel unit 540, a port 554 for receiving an idle signal from port 514 of the graphics engine 510, the idle signal indicating whether the graphics engine 510 is done processing an associated plurality of previously received execution instructions, a port 556 communicatively coupled with the system memory 504 via the system bus 506, the port 556 providing for accessing at least one semaphore associated with the shared resource 530, and a port 558 for providing a first channel control signal to port 546 of the first channel unit 540. The first channel control unit 550 operates in a manner similar to the first channel control unit 240 (FIG.

4) as described above with reference to the process 400 (FIG. 7). In one embodiment, the shared resource 530 includes a first buffer and a second buffer and is operative to operate in accordance with a double buffering process. The graphics engine 510 is operative to render image data to the buffers of the frame buffer 530 in response to the execution instructions provided to port 512 of the graphics engine under control of the channel control unit 550. The system 500 further includes a second channel unit 560 for providing execution instructions to the video engine 520 under control of a second channel control unit 570. Each of the first and second channel units 540 and 560 includes an associated blocking mechanism such as the first and second blocking mechanisms 224 and 230 (FIG. 4). Operation of the first and second channel control units is identical to that described above for the channel control units 240 and 250 (FIG. 4).

In the depicted embodiment of the present invention, the CPU 502 is operative to generate the first and second sets of instructions, and to write the instructions in the form of instruction lists 324 (FIG. 5C) to the system memory 504 which stores the instruction lists associated with the graphics engine and the video engine. In the depicted embodiment, the CPU 502 writes portions of the instruction lists to the first and second channel units 540 and 560. The graphics engine 510 receives the associated set of instructions via the channel unit 540, and accesses the shared resource 530 under control of the channel control unit 550. Likewise, the video engine 520 receives its associated instructions via the channel unit 560, and accesses the shared resource 530 under control of the second channel control unit 570.

Figure 10:
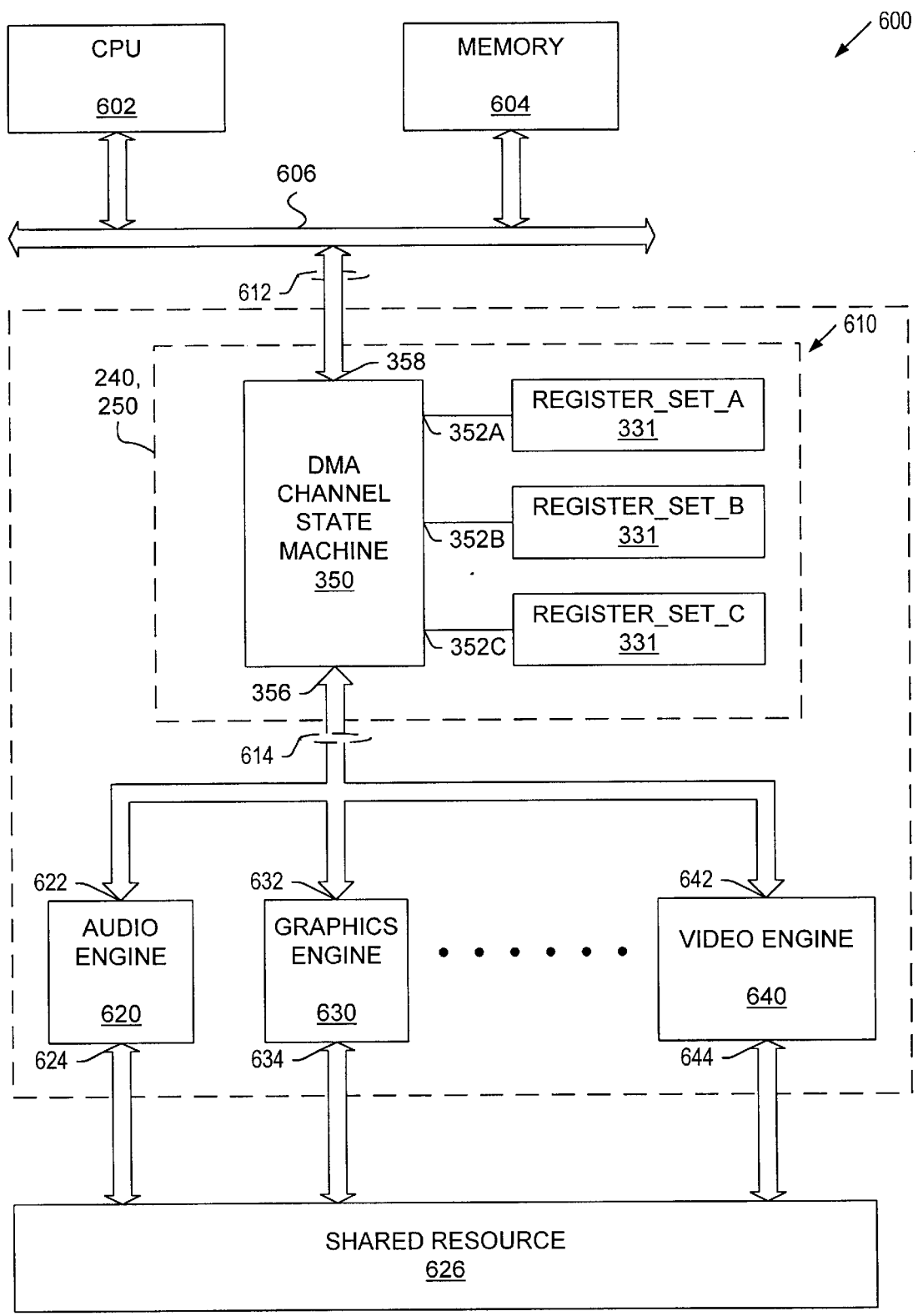
FIG. 10 is a schematic block diagram generally illustrating a second embodiment of a computer graphics system in accordance with the present invention.

FIG. 10 shows a schematic circuit block diagram generally illustrating a second embodiment of a computer graphics system at 600 in accordance with the present invention, the system 600. The system 600 includes: a CPU 602 operative to generate instruction lists for each of a plurality of execution units sharing a resource, each of the instruction lists including a plurality of execution instructions, and a plurality of synchronization commands interspersed between associated execution instructions; a system memory 604 communicatively coupled with the CPU 602 via a system bus 606, the system memory for storing the instruction lists generated by the CPU; a direct memory access (DMA) channel control unit 610 having a port 612 communicatively coupled with the CPU 602 and system memory 604 via the system bus, and a port 614, the DMA channel control unit 610 being operative to directly access portions of each of the instruction lists stored in the system memory 604; an audio engine 620 having a port 622 communicatively coupled with port 614 of the DMA channel control unit 610 for receiving execution instructions of an associated one of the instruction lists read by the DMA channel control unit 610 from the system memory 604, and a port 624 communicatively coupled with a shared resource 626; a graphics engine 630 having a port 632 communicatively coupled with port 614 of the DMA channel control unit 610 for receiving execution instructions read by the DMA channel control unit 610 from the system memory 604 via an associated virtual channel, and a port 634 communicatively coupled with the shared resource 626; and a video engine 640 having a port 642 communicatively coupled with port 614 of the DMA channel control unit 610 for receiving execution instructions read by the DMA channel control unit 610 from the system memory 604, and a port 644 communicatively coupled with the shared resource.

The DMA channel control unit 610 is implemented by the DMA channel control unit 240, 250 (FIG. 6). In the depicted embodiment, the DMA channel state machine 350 is operative to access instructions stored in the system memory 604 in the same manner described above with reference to processes 400 and 409 (FIGS. 7A and 7B). In one embodiment, the shared resource 626 is a frame buffer, and the semaphores associated with the buffers are stored in the system memory 604. In other embodiments of the present invention, the semaphores may be stored at any other location of the system 600 that is accessible by the DMA channel state machine 350. As mentioned above, in accordance with the present invention, each of the synchronization instructions, shared resource, and semaphore values may be stored in any memory including but not limited to the system memory unit.

Note that the DMA channel control unit 240, 250 includes three sets of registers 331 (FIG. 6) designated REGISTER_SET_A, REGISTER_SET_B, and REGISTER_SET_C, each being associated with one of the three engines 620, 630, and 640 and its associated virtual channel. As described above, each of the sets of registers 331 includes an acquire register 332 (FIG. 6) for storing associated acquire values, a release register 336 (FIG. 6) for storing associated release values, a pointer register 340 (FIG. 6) for storing associated pointer values, and a timeout register 344 (FIG. 6) for storing an associated predetermined timeout value. Each of the sets of registers 331 provides an associated context for the DMA channel state machine 350 to operate on behalf of the associated one of the virtual DMA channels as explained below.

Note that instructions and data may be transferred via the system bus 606 to only one of the engines 620, 630, and 640 at a time. Therefore, only one of the virtual DMA channels may be active at a time while the other virtual DMA channels are idle, or deactivated. The DMA channel state machine 350 is operative to execute the acquire and release processes 400 and 409 (FIGS. 7A and 7B) for each of the engines and associated virtual DMA channels one at a time using the context provided by the associated one of the sets of registers 331.

In accordance with one embodiment, the DMA channel state machine 350 includes logic for implementing a round robin arbitration scheme to determine which of the virtual DMA channels is to be activated at a given time. In accordance with the round robin scheme, the resources of the DMA channel state machine 350 (including execution of the acquire and release processes 400 and 409 of FIGS. 7A and 7B) are applied to activate the virtual channels one at a time during allocated time slices. The time sliced sharing of the resources of the DMA channel state machine 350, system bus 606, and system memory 604 prevents any one of the engines and its associated virtual DMA channel from using these resources for an excessive time period.

If one of the virtual DMA channels is activated for a period of time exceeding the time slice period, the virtual DMA channel is "put to sleep", or deactivated, and the DMA channel state machine 350 activates the next virtual DMA channel in accordance with the round robin scheme.

As an example, consider that the resources of the DMA channel state machine 350 are granted for a particular one of the engines 620, 630, 640 and its associated virtual channel, and the particular engine is currently waiting to acquire ownership of the shared resource 626. In this case, the DMA channel state machine 350 activates the associated virtual DMA channel and executes the acquire process 400 (FIG. 7A) using the context of the associated set of registers 331. If it is determined at 406 and 407 (FIG. 7A) that the predetermined relationship between the associated acquire value and semaphore is satisfied, or that the timeout period has expired, then the DMA channel state machine 350 provides additional instructions and data to the particular engine via the associated virtual DMA channel. However, if it is determined at 406 and 407 (FIG. 7A) that the predetermined relationship is not satisfied, and the timeout period has not expired, then the associated virtual channel is deactivated, or "put to sleep", by the DMA channel state machine 350 because no instructions and/or data is to be provided to the particular engine via the associated virtual channel during the current time slice. In this case, the resources of the DMA channel state machine 350 are applied to the next virtual DMA channel in accordance with the round robin scheme.

Although the present invention has been particularly shown and described above with reference to a specific embodiment, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. A shared resource management system providing controlled accessing of at least one shared resource by at least one execution unit, the system comprising:
   a channel control unit operative to access a sequence of instructions stored in an instruction storage unit, said sequence of instructions including a plurality of execution instructions and a plurality of synchronization commands interspersed between associated execution instructions; and
   at least one execution unit communicatively coupled with said channel control unit for receiving associated execution instructions from said channel control unit via an associated channel, said execution unit being capable of accessing at least one shared resource;
   said channel control unit being responsive to said synchronization commands and operative to access at least one semaphore value stored in a semaphore storage unit, said semaphore value being associated with a shared resource and indicating an ownership status for said shared resource, said channel control unit being operative to manage the flow of said execution instructions to said execution unit via said associated channel in order to manage accessing of the shared resource by said execution unit.

2. A shared resource management system as recited in claim 1 wherein said execution unit is a first execution unit, and wherein said channel is a first channel, and wherein said system further comprises a second execution unit communicatively coupled with said channel control unit for receiving associated execution instructions from said channel control unit via a second channel, said first and second execution units being capable of accessing at least one shared resource, said channel control unit being operative to manage the flow of said execution instructions to said first and second execution units via said first and second channels in order to cause said first and second execution units to cooperate in their accessing of the shared resource.

3. A shared resource management system as recited in claim 1 wherein each of said synchronization commands is associated with one of said execution units, and wherein said synchronization commands comprise an acquire command having an associated acquire value, said acquire command indicating that said associated execution unit may acquire ownership of a shared resource upon a determination that said associated acquire value has a predetermined relationship with an associated semaphore value.

4. A shared resource management system as recited in claim 3 wherein said predetermined relationship between said associated acquire value and said associated semaphore value is determined if said associated acquire value equals said associated semaphore value.

5. A shared resource management system as recited in claim 1 wherein each of said synchronization commands is associated with one of said execution units, and wherein said synchronization commands comprise a release command having an associated release value indicating that said associated execution unit is to relinquish ownership of the shared resource after said associated execution unit is done accessing a shared resource.

6. A shared resource management system as recited in claim 3 wherein said channel control unit is operative to perform a shared resource ownership acquisition process in response to a received acquire command having an associated received acquire value, said acquire process comprising the steps of:
   comparing the received acquire value with an associated current semaphore value to determine whether a predetermined relationship is satisfied between said received acquire value and said associated current semaphore value; and
   if said predetermined relationship is satisfied, providing a portion of the execution instructions associated with said received acquire command to said associated execution unit via said associated channel.

7. A shared resource management system as recited in claim 6 wherein said acquire process further comprises the steps of:
   if said predetermined relationship is not satisfied, determining whether a predetermined timeout period has expired; and
   if said predetermined timeout period has expired, providing a portion of the execution instructions associated with said received acquire command to said associated execution unit via said associated channel.

8. A shared resource management system as recited in claim 5 wherein said channel control unit is operative to perform a shared resource ownership release process in response to a received release command having an associated received release value, said release process comprising the steps of:
   determining whether the associated execution unit is done processing a portion of said associated execution instructions associated with a previously received acquire command; and
   if said execution unit is done, writing said associated release value to an associated semaphore storage location.

9. A shared resource management system as recited in claim 2 wherein each of said first and second channels is a virtual DMA channel, wherein each of said synchronization commands is associated with one of the first and second virtual DMA channels, and wherein said channel control unit is operative to activate each of said first and second virtual DMA channels to provide at least one of the associated synchronization commands to the associated one of the first and second execution units upon initiation of an associated time slice period.

10. A shared resource management system as recited in claim 9 wherein said channel control unit is operative to activate the virtual DMA channels one at a time in accordance with a round robin arbitration scheme.

11. A shared resource management system as recited in claim 9 wherein said synchronization commands include an acquire command having an associated acquire value, and wherein said channel control unit is operative to perform a shared resource ownership acquisition process for each of the first and second virtual DMA channels in response receiving an acquire command having an associated acquire value via a particular virtual DMA channel that is currently activated, said acquire process comprising the steps of:

comparing the received acquire value with an associated current semaphore value to determine whether a predetermined relationship is satisfied between said received acquire value and said associated current semaphore value;

if said predetermined relationship is not satisfied, determining whether a predetermined timeout period has expired;

if said predetermined timeout period has not expired, deactivating the particular virtual DMA channel, and activating a next virtual DMA channel.

12. A shared resource management system as recited in claim 9 wherein said channel control unit is operative to perform the steps of:

determining whether a particular virtual DMA channel has been activated for a period of time exceeding a predefined time slice period; and if said particular virtual DMA channel has been activated for a period of time exceeding said predefined time slice period, deactivating said particular virtual DMA channel.

13. A process of coordinating accessing of a shared resource by a plurality of execution units, comprising the steps of:

receiving a synchronization command having an associated value, the synchronization command being associated with a set of execution instructions for execution by an execution unit requiring access to a shared resource during execution of the set of execution instructions; and executing the set of execution instructions by the execution unit upon validation of the synchronization command based on a comparison of the value with a stored value stored at a storage location.

14. A process of coordinating accessing of a shared resource by a plurality of execution units, comprising the steps of:

receiving a first synchronization command having an associated first value, the first synchronization command being associated with a first set of execution instructions for execution by a first execution unit, the first execution unit requiring access to a shared resource during execution of the first set of execution instructions; and executing the first set of execution instructions by the first execution unit upon validation of the first synchronization command based on a comparison of the first value with a stored value stored at a storage location;

receiving a second synchronization command having an associated second value; and writing the second value to the storage location after the first execution unit is done processing the first set of execution instructions.

15. A process of coordinating accessing of a shared resource as recited in claim 14 further comprising the steps of:

receiving a third synchronization command having an associated third value, the third synchronization command being associated with a second set of execution instructions for execution by a second execution unit, the second execution unit requiring access to the shared resource during execution of the second set of execution instructions; and executing the second set of execution instructions by the second execution unit upon validation of the third synchronization command based on a comparison of the third value with the second value stored at the storage location.

16. A process of coordinating accessing of a shared resource as recited in claim 14 wherein the step of receiving the first synchronization command comprises directly accessing a system storage that stores a list of instructions including a plurality of execution instructions and a plurality of synchronization commands interspersed between associated execution instructions.

17. A process of coordinating accessing of a shared resource as recited in claim 16 wherein each of the synchronization commands is associated with one of the execution units, and wherein the synchronization commands comprise an acquire command having an associated acquire value, the acquire command indicating that the associated execution unit may acquire ownership of a shared resource upon a determination that the associated acquire value has a predetermined relationship with an associated semaphore value.

18. A process of coordinating accessing of a shared resource as recited in claim 17 wherein the associated execution unit may also acquire ownership of the shared resource upon a determination that a predetermined timeout period has expired.

19. A process of coordinating accessing of a shared resource as recited in claim 16 wherein each of the synchronization commands is associated with one of the execution units, and wherein the synchronization commands comprise a release command having an associated release value indicating that the associated execution unit is to relinquish ownership of the shared resource after the associated execution unit is done accessing a shared resource.

20. A shared resource management system, comprising:

an instruction storage unit having a sequence of instructions including a plurality of execution instructions and a plurality of synchronization commands;

a shared resource;

a plurality of execution units each capable of accessing said shared resource;

a plurality of channels for coupling execution instructions from said instruction storage unit to said plurality of execution units, wherein each execution unit receives a flow of execution instructions from a respective channel;

a semaphore storage unit having at least one semaphore value; and at least one channel control unit operative to manage a flow of execution instructions to said plurality of execution units from said plurality of channels, said at least one channel control unit reading said at least one semaphore value and said synchronization commands and determining which of said channels to block to synchronize access to said shared resource.

* * * * *